(12) United States Patent
Norden et al.

(10) Patent No.: US 12,161,067 B2
(45) Date of Patent: Dec. 10, 2024

(54) FIBER MAT WITH CHANNELS

(71) Applicant: PROFILE PRODUCTS L.L.C., Buffalo Grove, IL (US)

(72) Inventors: Daniel Scott Norden, Anderson, SC (US); Ryan Michael Knauer, Hickory, NC (US); Nathan Albert Carney, Smyrna, GA (US); Stanton Reid Smith, Hickory, NC (US); Gary Lane Bowers, Jonesborough, TN (US); Kevin Scott Spittle, Vero Beach, FL (US)

(73) Assignee: PROFILE PRODUCTS L.L.C., Buffalo Grove, IL (US)

( * ) Notice: Subject to any disclaimer, the term of this patent is extended or adjusted under 35 U.S.C. 154(b) by 588 days.

(21) Appl. No.: 17/150,176

(22) Filed: Jan. 15, 2021

(65) Prior Publication Data
US 2021/0212273 A1     Jul. 15, 2021

Related U.S. Application Data

(60) Provisional application No. 62/961,334, filed on Jan. 15, 2020.

(51) Int. Cl.
*A01G 13/02* (2006.01)
*B32B 3/02* (2006.01)
*B32B 3/30* (2006.01)
*B32B 5/26* (2006.01)

(52) U.S. Cl.
CPC ............ *A01G 13/0268* (2013.01); *B32B 3/02* (2013.01); *B32B 3/30* (2013.01); *B32B 5/26* (2013.01); *B32B 5/266* (2021.05); *B32B 2262/067* (2013.01)

(58) Field of Classification Search
CPC ........ A01G 13/0268; B32B 3/02; B32B 3/30; B32B 5/266; B32B 2262/067; E02D 17/20
See application file for complete search history.

(56) References Cited

U.S. PATENT DOCUMENTS

| | | | | |
|---|---|---|---|---|
| 3,597,928 | A | * | 8/1971 | Pilaar ..................... E02B 3/122 405/20 |
| 5,176,469 | A | * | 1/1993 | Alsop ..................... E02B 3/043 405/24 |
| 5,302,445 | A | | 4/1994 | DePetris et al. |
| 5,330,828 | A | | 7/1994 | Jacobsen, Jr. et al. |
| 5,484,501 | A | * | 1/1996 | Jacobsen, Jr. ......... E02D 17/202 264/122 |
| 5,575,584 | A | * | 11/1996 | Alsop ..................... E02B 3/121 405/24 |

(Continued)

FOREIGN PATENT DOCUMENTS

KR       100562856 B1 *  3/2006

OTHER PUBLICATIONS ip.com translation of KR100562856B1 (Year: 2024).*

*Primary Examiner* — Michael Zhang
(74) *Attorney, Agent, or Firm* — BROOKS KUSHMAN P.C.

(57) ABSTRACT

A fiber mat includes natural wood fibers formed into an elongated strip having an upper surface and a lower surface, the upper surface having a first plurality of channels extending into the elongated strip, each of the first plurality of channels having a channel depth being different in a central portion of the mat than in an edge portion of the mat.

12 Claims, 6 Drawing Sheets

(56) References Cited

U.S. PATENT DOCUMENTS

| | | | | |
|---|---|---|---|---|
| 5,786,281 A | * | 7/1998 | Prunty | A01G 20/20 |
| | | | | 405/15 |
| 8,567,117 B2 | | 10/2013 | Spittle | |
| 10,266,457 B2 | | 4/2019 | Spittle et al. | |
| 2006/0070294 A1 | * | 4/2006 | Spittle | A01G 13/0268 |
| | | | | 47/9 |
| 2006/0093441 A1 | * | 5/2006 | Starrett | E02B 3/04 |
| | | | | 405/32 |
| 2011/0044759 A1 | * | 2/2011 | Lancaster | E02D 17/202 |
| | | | | 405/19 |

* cited by examiner

FIBER MAT WITH CHANNELS

CROSS-REFERENCE TO RELATED APPLICATIONS

This application claims the benefit of U.S. provisional application Ser. No. 62/961,334 filed Jan. 15, 2020, the disclosure of which is hereby incorporated in its entirety by reference herein.

TECHNICAL FIELD

The present invention is directed to fiber mats with channels and to a process of preparing the fiber mats with channels.

BACKGROUND

Fiber mats are in widespread use in preventing or inhibiting soil erosion and/or aiding in germination of seed beds. Designing well-functioning fiber mats has been a challenge because fiber mats need to have satisfactory physical characteristics which are often conflicting. For example, the mats should aid in water retention when used to aid seed germination, yet should be open enough to allow seedlings to penetrate the mat. At the same time, the mats should not accumulate an excessive amount of water or allow water to pool within the mats. The mats should also have sufficient strength to be handled effectively during transport and installation over soil and/or seedbeds and should retain their integrity over extended periods while exposed to the elements. Yet, it would be desirable to provide mats which are biodegradable not to burden the environment. Thus, there is a need for fiber mats capable of fulfilling all of these requirements.

SUMMARY

In at least one embodiment, a fiber mat is disclosed. The fiber mat may include a first portion, second portion, and/or third portion of materials. The first portion may include natural fibers. The second portion may include synthetic fibers. The synthetic fibers may include a low-melt fiber and high-melt fiber. In at least one embodiment, the low-melt fiber may be melted by a threshold temperature which is a temperature at which the high-melt fiber remains unmelted. The mat may include at least one channel formed as a recessed area on the mat surface and penetrating a depth into the mat. The mat may include a plurality of channels forming a pattern. The pattern may be a diamond pattern. The channels are arranged to increase tensile strength of the mat, integrity of the mat, enable water flow and retention, and reduce water run-off.

In another embodiment, a process for forming the mat with channels is disclosed. The method may include mixing of the fibers in the first portion, second portion, and/or materials in the third portion to form a mixture or an unconsolidated web of fibers/materials. The process may include forming an as-laid mat from the mixture or web. The method may include applying heat, pressure, or both to at least partially consolidate at least some of the fibers. The method may include at least partially melting the low-melt fiber of the second portion to assist with consolidating the mat. The method may further include forming channels on at least one surface of the mat. The channel forming may include application of heat and/or pressure by rollers, stamps, hot rods, or the like.

In yet another embodiment, the mat with channels described herein may be used as a tool or a system for erosion control. In another embodiment, the mat may be used for seed germination in a grow bag.

In at least one embodiment, a fiber mat is disclosed. The fiber mat includes natural wood fibers formed into an elongated strip. The elongated strip has an upper surface and a lower surface, the upper surface having a first plurality of channels extending into the elongated strip. Each of the first plurality of channels has a channel depth. The channel depth may be different in a central portion of the mat than in an edge portion of the mat. The lower surface may also include a second plurality of channels. The channel depth may be greater in the central portion than in the edge portion. The channels may not be parallel to edges of the mat. The channel depth may be less than 50% of a mat thickness. Each one of the first plurality of channels may have a first wall and a second wall, each of the first and second walls extending at an angle from the upper surface toward the other of the first and second walls. The first plurality of channels may form a diamond pattern.

In another embodiment, a horticultural slab is disclosed. The slab includes a plurality of layers of a mat having heat-treated natural fibers. The mat has an upper surface and a lower surface, at least one of the surfaces including a first plurality of channels extending from the surface into the mat. Each of the first plurality of channels extends to a channel depth smaller than a mat thickness. The mat is free from synthetic fibers. The lower surface may include a second plurality of channels. The first plurality of channels of the upper surface and the second plurality of channels of the lower surface may align. Each of the separate layers may have four edges defining the separate layer. The mat may include a continuous sheet having the plurality of layers folded in an accordion configuration. Each of the first plurality of channels may have a first thickness and a remainder of the mat may have a second thickness greater than the first thickness. Each surface may have a different arrangement of the plurality of channels.

In another embodiment, an erosion mat is disclosed. The erosion mat includes natural fibers, including wood fibers, and synthetic fibers formed into an elongated strip having an upper surface and a bottom surface, the upper surface having a plurality of channels extending into the elongated strip, each of the plurality of channels having a channel depth being different in a central portion of the mat than in an edge portion of the mat. Each of the plurality of channels may have a first thickness and a remainder of the elongated strip may have a second thickness greater than the first thickness. The channels may not be parallel to edges of the mat. The channel depth may be less than 50% of a mat thickness. Each of the plurality of channels may have a first density and a remainder of the elongated strip may have a second density, the first density being greater than the second density. The synthetic fibers may be present only in the plurality of channels.

DETAILED DESCRIPTION

Figure 1:
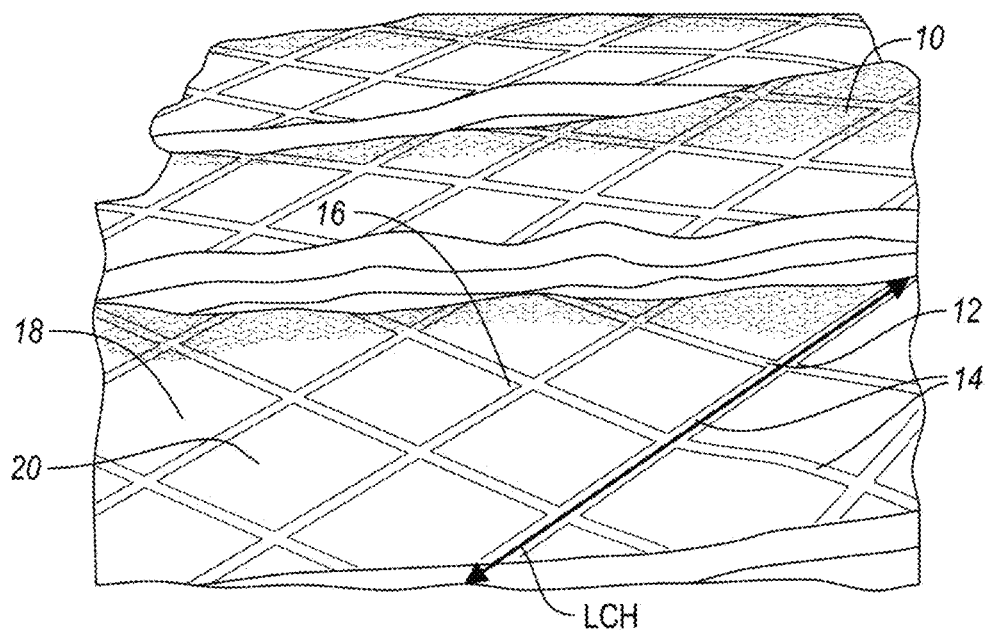
FIG. 1 is a photograph of a non-limiting example of a fiber mat with channels according to embodiments disclosed herein.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within +0%, 0.1%, 0.5%, 1%, 2%, 3%, 4%, 5%, or 10% of the value or relative characteristic.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. First definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Fiber mats, mulch mats, or turf reinforcement mats ("TRM") have become commonly used in erosion control and seed germination. Various approaches have been taken with respect to achieving the desired properties mentioned above such as water retention and structural strength. Typically, fiber mats have been bound together with the aid of numerous organic binders, both natural and synthetic. Natural binders may include starches, vegetable gums, and the like, including chemically modified celluloses such as hydroxyethyl cellulose, hydroxypropyl cellulose, carboxymethyl cellulose, and the like. Such natural or chemically-modified natural binders suffer from the defect of rapid degradation due to exposure to and action of microorganisms.

On the other hand, synthetic polymeric binders such as styrene-butadiene latexes, polyacrylates, polyacrylamides, acrylic acid/acrylamide copolymers, polyvinylacetate, polyvinylacetate-ethylene copolymers, phenolic resins, and the like have also been used. Such polymer-based binders are generally more expensive than natural binders, and many share at least moderate water solubility or swellability, which decreases the binding capability and hence strength of the product over time following installation. Even directly after manufacture, such products frequently exhibit deficient strength properties.

An alternative way to keep fibers of the mats bound together has been via polymeric netting incorporated within the mat body. The netting; however, may represent a number of disadvantages. For example, portions of the netting may lose their strength rapidly due to exposure to environmental factors such as UV light. Other portions which become encased in soil and sediment may persist for many years, resulting in an environmentally undesirable contaminant. Such netting is also susceptible to entanglement by animal traffic, which may result in tearing or displacement of the mat, or the ensnaring of small animals. Additionally, damage to the netting may be caused by machinery such as lawn mowers and the like. Commercial products may also exhibit less than adequate water holding capacity as well as lesser ability to conform to the terrain due to the increase in stiffness provided by the netting.

Thus, it would be desirable to provide a fiber mat which possesses adequate strength, is capable of enduring exposure to the outside elements such as UV light, fluctuation of temperatures, precipitation, high winds, fauna, microorganisms, and at the same time aids in water retention/flow/drainage for proper seed bed establishment, germination, plant growth, and/or erosion control.

According to one or more embodiments, a fiber mat 10 is disclosed. A non-limiting example of the mat 10 is shown in FIG. 1. The mat 10 may be also formed as a slab or a relatively flat fiber piece. The slab may be a horticultural slab for seed germination, seedling establishment, growth of plants, etc.

The mat 10 may be designed to have various shapes. For example, the mat 10 may be produced as rectangular, square, or having another shape. For transportation or application purposes, the mat 10 may be rolled in a roll or be folded in an accordion fold, or another type of fold, having two or more layers. The mat 10 may form an elongated strip. For transportation or application, the mat 10 may be cut into any shape including a rectangle, square, circle, oval, triangle, pentagon, trapezium, the like, or any other shape.

Figure 3A:
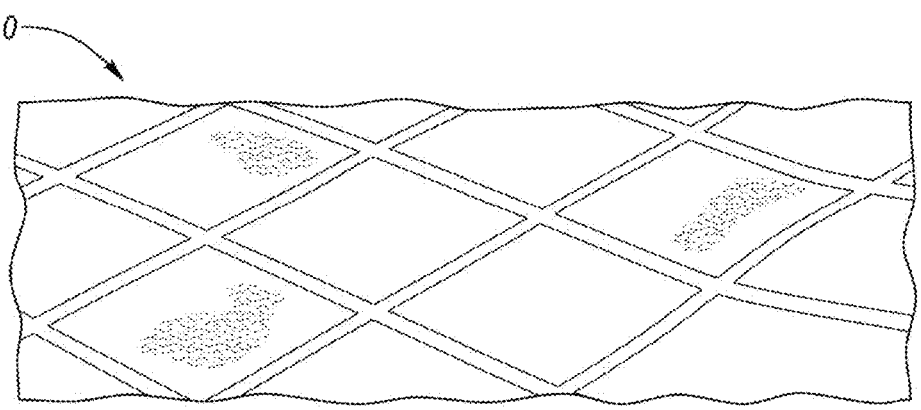
FIGS. 3A and 3B are photographs of non-limiting examples of mats with a diamond channel pattern.
Figure 3B:
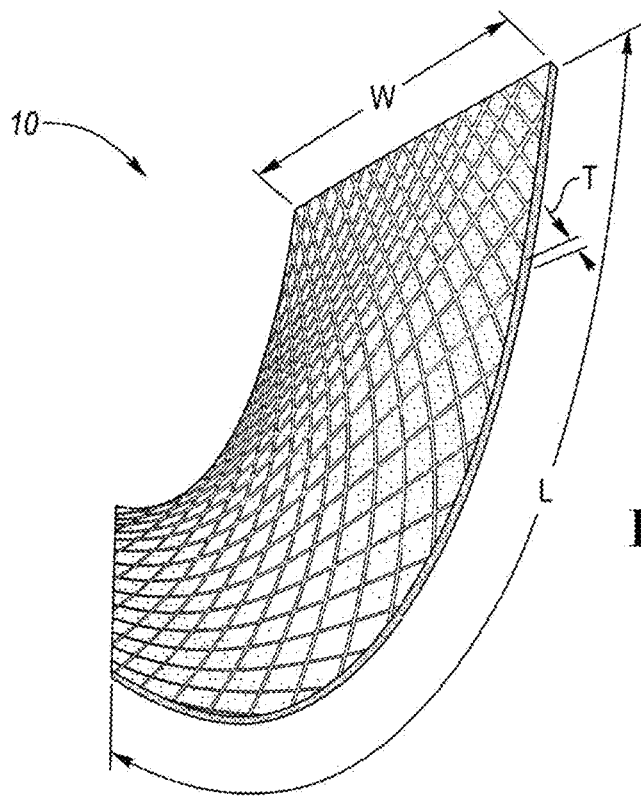

The mat 10 may have a length l, width w, and a thickness t. The length l may be greater than width w greater than thickness t. The mat 10 may be produced as a continuous strip or mat onto a roll. As such the length l, width w, and thickness t of the mat may be adjusted according to needs of a specific application as the material from the roll may be cut into a desired length, width, and produced in a desired thickness. For example, an example length and width may be a length and a width needed to fill a grow bag or a container of specific dimensions with the mat, the mat material being either folded or unfolded. The l, w, t of a non-limiting example of a mat 10 are shown in FIG. 3B.

The thickness t may be in a range of about 0.15 to 20, 1 to 18, 5 to 15, or 8 to 10 cm. The l, w, and/or t may be uniform and/or non-uniform throughout the mat. At least one of or all l, w, t may be different or fluctuate throughout the mat 10.

The mat 10 may be relatively flat and/or thin such that the thickness of the mat 10 may be about, at most about, or at least about 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.0, 1.05, 1.1, 1.15, 1.2, 1.25, 1.3, 1.35, 1.4, 1.45, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 6.0, 6.5, 7.0, 7.5, 8.0, 8.5, 9.0, 9.5, 10, 10.5, 11, 11.5, 12, 12.5, 13, 13.5, 14, 14.5, 15, 15.5, 16, 16.5, 17, 17.5, 18, 18.5, 19, 19.5, or 20 cm.

The thickness refers to the thickness of the mat channel material and/or material free of channels, as is defined below. The thickness of the channel-free material is greater than the thickness of the channel material. The thickness of the channel material may be about 1.5 to 5, 2 to 4, or 2.5 to 3 times lesser than the thickness of the channel-free material. The thickness of the channel material may be about, at least about, or at most about 1.5, 1.8, 2.0, 2.2, 2.5, 2.8, 3.0, 3.2, 3.5, 3.8, 4.0, 4.2, 4.5, 4.8, or 5.0 times lesser than the thickness of the channel-free material.

The thickness of the channel material may be about 0.15 to 10, 0.2 to 8, or 0.3 to 5 cm. The thickness of the channel material may be about, at least about, or at most about 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.0, 1.05, 1.1, 1.15, 1.2, 1.25, 1.3, 1.35, 1.4, 1.45, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 6.0, 6.5, 7.0, 7.5, 8.0, 8.5, 9.0, 9.5, or 10 cm. The thickness of the channel material may be a first thickness.

The thickness of the channel-free material may be about 0.5 to 20, 1 to 18, 5 to 15, or 8 to 10 cm. The thickness of the channel-free material may be about, at least about, or at most about 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.0, 1.05, 1.1, 1.15, 1.2, 1.25, 1.3, 0.35, 1.4, 1.45, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 6.0, 6.5, 7.0, 7.5, 8.0, 8.5, 9.0, 9.5, 10, 10.5, 11, 11.5, 12, 12.5, 13, 13.5, 14, 14.5, 15, 15.5, 16, 16.5, 17, 17.5, 18, 18.5, 19, 19.5, or 20 cm. The thickness of the channel-free material may be a second thickness.

As can be seen, for example, in FIG. 1, the mat 10 may include at least one channel 12, one or more channels 12, or a plurality of channels 12. The channels 12 may form a system or a network of channels 14. A non-limiting example of channels 12 in a system 14 is shown in FIG. 1. The channels 12 decrease the thickness/in one or more regions of the mat 10.

The channels 12 may be defined at the surface of the mat 10 and extend into a channel depth dch of the mat 10. The channel depth dch is shown in FIGS. 2A-2I. The depth dch may be such a suitable depth that the channels do not penetrate through the entire thickness/of the mat and the mat 10 is free of holes as a result of channel formation. In other words, the channel depth dch is smaller than the mat thickness t. The channel depth dch may be defined as a percentage of the mat thickness t. In certain embodiments, the channel depth dch may be about or at least about 5 to 60, 10 to 50, or 20 to 30% of t. In other embodiments, the channel depth dch may be about, at least about, or at most about 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 90, 91, 92, 93, 94, 95, 96, 97, or 98% of the mat thickness 1.

The channels 12 may each have a channel width wch. The channel width wch is shown in FIGS. 2A-2I. wch may equal dch. wch may be greater or smaller than dch. In a non-limiting example, the ratio of wch to dch may be about, at least about, or at most about 1:2, 1:3, 1:4, 1:5, 1:6, 1:7, 1:8, 1:10, or the like. In a non-limiting example, the ratio of dch to wch may be about, at least about, or at most about 1:2, 1:3, 1:4, 1:5, 1:6, 1:7, 1:8, 1:10, or the like. The channel width wch may be about 0.2 to 3.0, 0.5 to 2.5, or 1.0 to 1.5 cm. The channel width wch may be about, at least about, or at most about 0.2, 0.4, 0.6, 0.8, 1.0, 1.2, 1.4, 1.6, 1.8, 2.0, 2.2, 2.4, 2.6, 2.8, or 3.0 cm.

The dch, wch, or both may be uniform or non-uniform. For example, the dch or wch may gradually increase or decrease in a direction. The direction may be from a central portion 16 of the mat 10 towards an edge portion 18 or one or more edges of the mat 10. In a non-limiting example, the central portion 16 of the mat 10 may have a greater channel depth dch than a channel depth dch at an edge portion 18 of the mat 10. The channels 12 may have the same or different dch, wch, or both.

The channels 12 may have the same or different shape. For example, all of the channels 12 may have the same or different cross-section. Non-limiting examples of channel cross-sections are shown in FIGS. 2A-I. While FIGS. 2A-2F show relatively precisely- or well-defined cross-sectional shapes, the channels 12 may have imprecisely defined edges or boundaries. The channels 12 may have a well-defined boundary, where a defined channel cross-section abruptly changes the contour of the mat surface as in FIGS. 2A-2F. Alternatively, at least some of the channels 12 may have a gradual transition between the mat body free of channels 20, a channel-free region or material, and the channel 12, a channel region or material, as is depicted, for example, in FIGS. 2G-2I. The material the mat 10 is made from and/or the process used to form the channels may influence their shape and definition. For example, very fine fibers, an increased length of time dedicated to the channel-forming, or another process parameter such as elevated temperature and/or pressure may form more well-defined channels 12. Additionally, the channel dimensions and ratios of channel width wch to channel depth dch may influence how precise or relaxed the transition between the channel-free region 20 of the mat 10 to the channels 12 is.

Figure 2A:
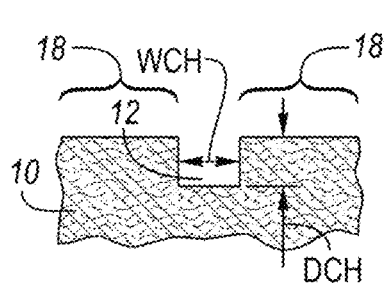
FIGS. 2A-2I are schematic depictions of various non-limiting examples of cross-sections of channels within the mat disclosed herein.
Figure 2B:
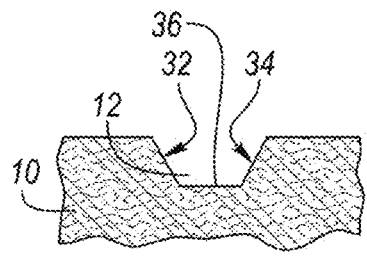
Figure 2C:
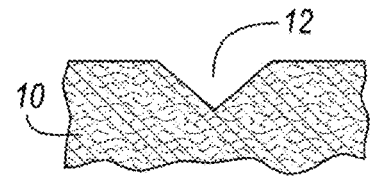
Figure 2D:
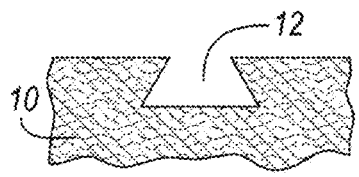
Figure 2E:
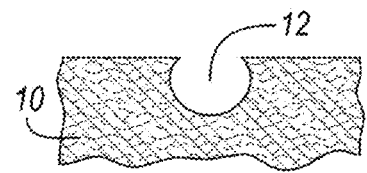
Figure 2F:
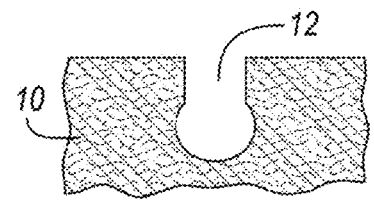
Figure 2G:
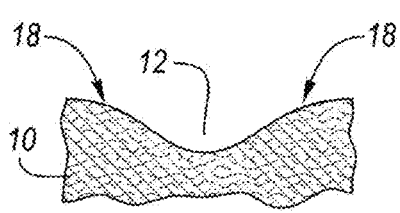

As can be further seen in FIGS. 2A-2I, especially in FIG. 2B, each channel has a first wall 32, a second wall 34, and a bottom 36. The wall 32, 34 may extend at an angle from the upper surface towards the other of the walls 32, 34, the bottom, or a combination thereof. The angle may be about 25 to 135, 40 to 120, or 45 to 90 degrees. The bottom 36 may be a single point, have a width of the channel width wch, be rounded, curved, straight, shaped like a saddle, or the like.

Figure 2H:
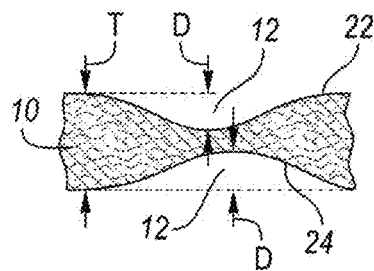
Figure 2I:
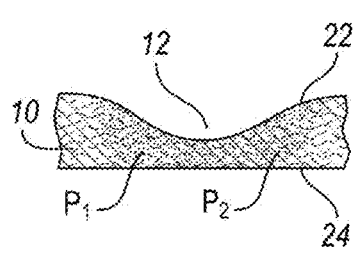

The channels 12 may be present on one side or one surface such as the top 22 surface of the mat 10, as is depicted in FIG. 2I or on both sides or both surfaces such as the top 22 and bottom 24 surfaces of the mat 10, as is depicted in FIG. 2H. The top surface 22 may be the upper surface. The bottom surface 24 may be the lower surface. The top or upper surface may have a first plurality of channels. The bottom or lower surface may have a second plurality of channels.

The channel depth dch of the channel on each side 22, 24 may be the same or different. dch1 may be greater, smaller, or equal to dch2. Likewise, the cross-section of the channel on each side or surface 22, 24 may be the same or different.

Figure 4A:
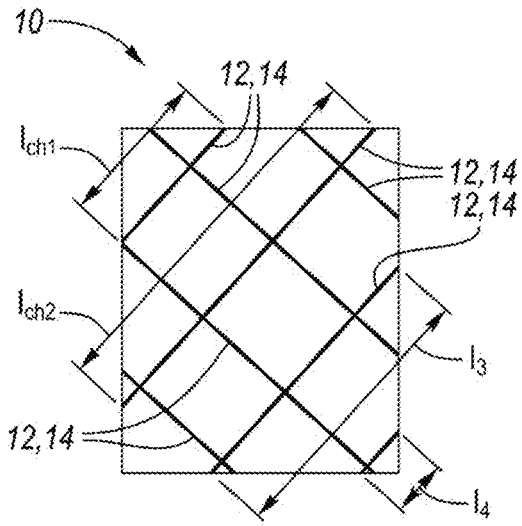
FIGS. 4A-4N are schematic depictions of various non-limiting examples of channel patterns.
Figure 4B:
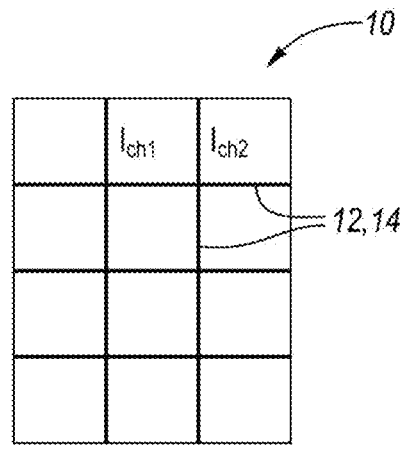
Figure 4C:
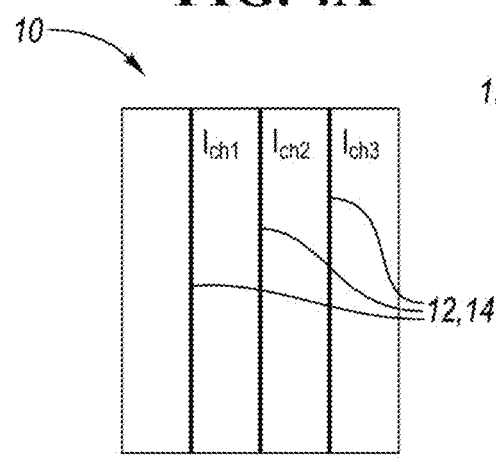
Figure 4D:
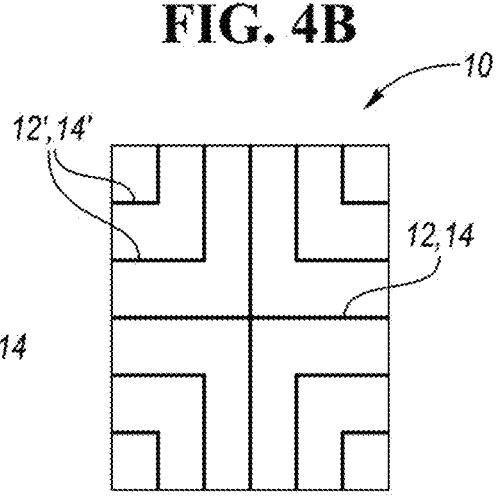
Figure 4E:
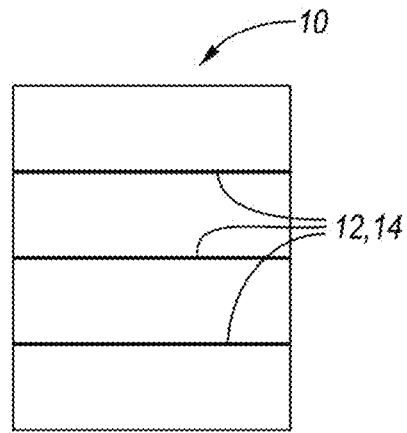

The system of channels 14 may form a pattern. For example, the pattern 14 may be a diamond pattern, as is shown in FIGS. 3A and 3B. In FIGS. 3A and 3B, the channels intersect at spaced and uniform distances to form diamonds having four sides. Alternatively, the pattern may be a square pattern, rectangular pattern, regular or irregular pattern. The pattern may include lines crossing one another, overlapping lines, lines running parallel to one another, lines running parallel to the edges of the mat, lines which are not parallel to the edges of the mat, lines running horizontally or vertically, or a combination thereof. Non-limiting examples of patterns are shown in FIGS. 4A-4N.

Each channel has a length lch, shown for example in FIG. 1. The length of the channels lch may be variable and depends on the length of the mat 10. For example, each channel or at least one channel may run the length or width of the mat or extend from a first end of the mat 10 to the opposite or another end of the mat 10. In at least one embodiment, all channels run the length or width of the mat 10. Depending on the pattern the channels 12 form, the length of the channels within the pattern may differ. A non-limiting example of channels 12 with variable length lch is shown in FIG. 4A, in which the diamond pattern determines the length of the channels. In the mat 10 of FIG. 4A, lch1, lch2, lch3, and lch4 have different lengths. In contrast, the pattern of FIGS. 4B and 4C has channels with the same length lch.

In a yet alternative embodiment, at least one channel 12 may have a length lch which is smaller than a dimension of the mat 10 such as length/or width w of the mat. For example, a plurality of channels 12 may have a length lch which is smaller than width w of the mat 10. Non-limiting examples of such a configuration are shown in FIG. 4H, 4I, or 4N. In at least one embodiment, the mat 10 may include a set of channels 12 with a length lch which is shorter than the width w of the mat 10 and at least one channel 12 or a plurality of channels 12 with lch which runs the length/or width w of the mat. A non-limiting example of such configuration is shown in FIG. 4G. In a non-limiting example, the channels 12 with length lch smaller than a width of the mat 10 may be arranged in a central portion of the mat, for example as is depicted in FIG. 4N.

The channel length lch may extend in one direction only, as is shown in FIGS. 4A, 4B, 4C, and 4E. Alternatively, at least one of the channels 12' may have a first direction which changes into a second direction, as is shown in FIG. 4D in a channel system 14'. The directional change may be provided via a sharp turn/curve or a gradual turn/curve. The turn may be a turn at an angle enabling proper water flow and drainage.

Figure 4F:
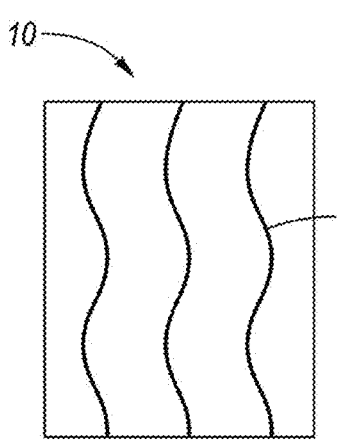
Figure 4G:
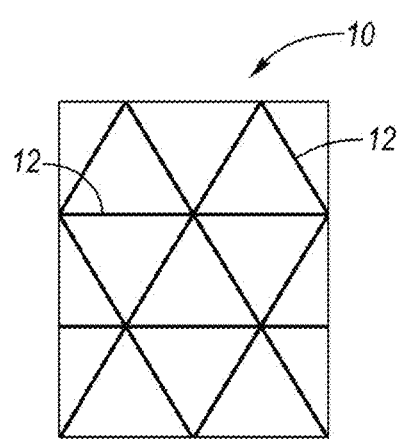
Figure 4H:
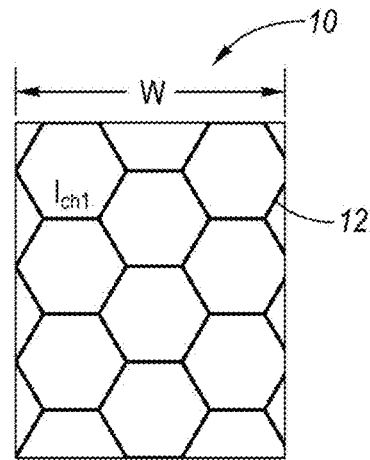
Figure 4I:
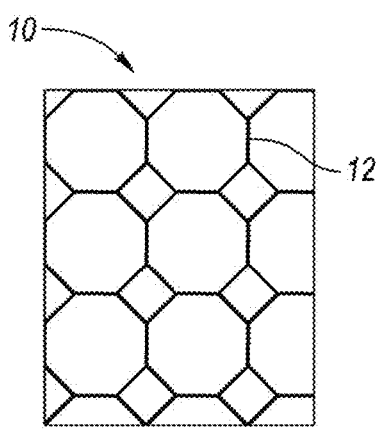
Figure 4J:
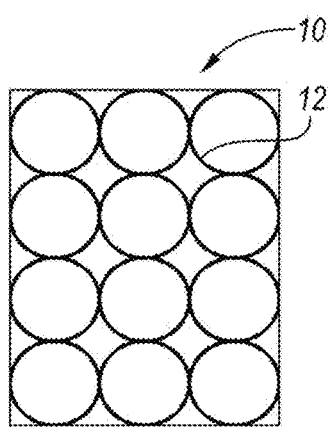
Figure 4K:
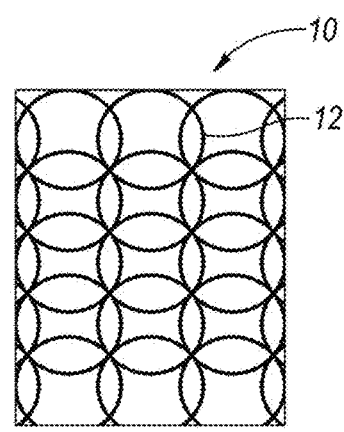
Figure 4L:
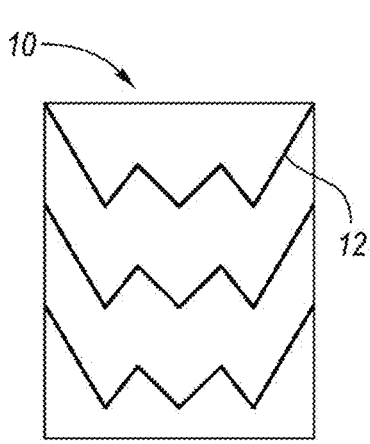
Figure 4M:
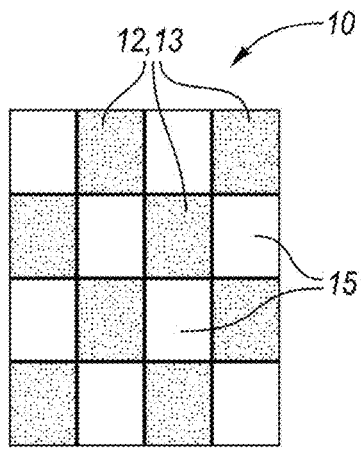
Figure 4N:
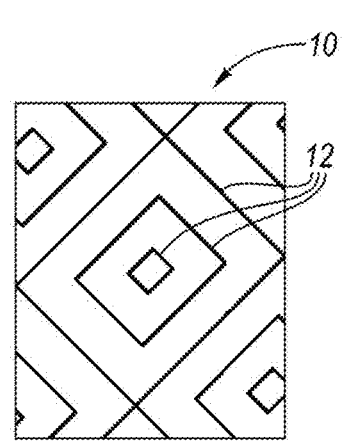

In at least some embodiments, the channel may have an undulating shape and/or curve(s), as is depicted in non-limiting examples of FIGS. 4F, 4J, and 4K. Lines overlapping or crossing one another are shown in non-limiting examples of FIGS. 4A, 4B, and 4K.

In a non-limiting example of 4M, a checkerboard pattern is depicted. The channels 12 have an extended width and length such that the mat is divided into channel fields 13 and non-channel fields 15. The entire surface area of each channel field 13 is depressed, as is described herein, to form a wide channel 12. The channels fields 13 and the non-channel fields 15 may have the same or different dimensions. For example, at least some of the channels fields 13 may have the same dimensions as at least one of the non-channel fields 15. The channel fields 13 may have smaller or greater width, length, or both as at least one of the non-channel fields 15.

The density or degree of compactness, and/or thickness, of the mat material 10 differs throughout the mat 10. For example, the material located around the channels 12, adjacent to the channels 12, within the channels 12, or surrounding the channels 12, which in summary is called "channel material," has a higher density, and lower thickness, than the material in the other portions of the mat 10, which is called "channel-free material." The adjacent area may be up to 1 to 10, 2 to 8, or 3 to 7% of the channel width.

The density of the mat material may increase gradually, progressively, abruptly, suddenly, brokenly, or sharply from the channel-free material of the region 20 of the mat 10 towards the channel material of the mat 10. The thickness of the mat material may decrease gradually, progressively, abruptly, suddenly, brokenly, or sharply from the channel-free material of the region 20 of the mat 10 towards the channel material of the mat 10.

The density of the channel material may be about 1.5 to 5, 2 to 4, or 2.5 to 3 times greater than the density of the channel-free material. The density of the channel material may be about, at least about, or at most about 1.5, 1.8, 2.0, 2.2, 2.5, 2.8, 3.0, 3.2, 3.5, 3.8, 4.0, 4.2, 4.5, 4.8, or 5.0 times greater than the density of the channel-free material.

The density of the channel material may be about 0.05 to 2, 0.07 to 1.5, or 0.8 to 1.1 g/cm$^3$. The density of the channel material may be about, at least about, or at most about 0.05, 0.06, 0.07, 0.08, 0.09, 0.10, 0.11, 0.12, 0.13, 0.14, 0.15, 0.16, 0.17, 0.18, 0.19 or 0.2 g/cm$^3$. The density of the channel material may be a first density.

The density of the channel-free material may be about 0.010 to 1.30, 0.014 to 1.00, or 0.016 to 0.73 g/cm$^3$. The density of the channel-free material may be about, at least about, or at most about 0.010, 0.012, 0.014, 0.016, 0.018, 0.020, 0.021, 0.022, 0.023, 0.024, 0.025, 0.026, 0.027, 0.028, 0.029, 0.030, 0.031, 0.032, 0.033, 0.034, 0.035, 0.036, 0.037, 0.038, 0.039, 0.040, 0.041, 0.042, 0.043, 0.044, 0.045, 0.046, 0.047, 0.048, 0.049, 0.050, 0.052, 0.054, 0.056, 0.058, 0.060, 0.062, 0.064, 0.066, 0.068, 0.070, 0.075, 0.080, 0.085, 0.090, 0.095, 0.10, 0.11, 0.12, 0.13, 0.14, 0.15, 0.16, 0.17, 0.18, 0.19, 0.20, 0.25, 0.30, 0.35, 0.40, 0.45, 0.50, 0.55, 0.60, 0.65, 0.70, 0.75, 0.80, 0.85, 0.90, 0.95, 1.00, 1.05, 1.10, 1.15, 1.20, 1.25, or 1.30 g/cm$^3$. The density of the channel-free material may be a second density.

The density of the material within the mat 10 is schematically illustrated in FIG. 2I, where the density of the material adjacent to and within the channel 12 $\rho 1$ is greater than the density of the channel-free region $\rho 2$.

The mean moisture content of the mat material may be about 3 to 12, 5 to 10, or 6 to 8%. The mean moisture content of the mat material may be about, at least about, or at most about 3, 3.5, 4, 4.5, 5, 5.5, 6, 6.5, 7, 7.5, 8, 8.5, 9, 9.5, 10, 10.5, 11, 11.5, or 12%.

Table 1 below shows non-limiting examples of channel material and channel-free material in a single mat. The properties were measured in the channels and in the non-channel mat body or non-channel material. Multiple measurements were taken, averages of which are provided in the Table 1 below. The mean moisture content of the example mat material was 6.52%.

TABLE 1

Properties of channel material and channel-free material of a non-limiting example mat

| Example No. | Description | Length [cm] | Width [cm] | Thickness [cm] | Mass [g] | Density [g/cm$^3$]/ [lb/ft3] |
|---|---|---|---|---|---|---|
| 1 | Channel material | 30.00 | 1.00 | 0.38260 | 0.83 | 0.07231/4.51 |
| 2 | | 12.80 | 1.00 | 0.40375 | 0.45 | 0.08707/5.43 |
| 3 | | 30.00 | 1.00 | 0.34043 | 0.95 | 0.09302/5.80 |
| 4 | | 35.00 | 1.00 | 0.23840 | 0.92 | 0.11026/6.88 |
| 5 | | 30.00 | 1.00 | 0.30160 | 1.00 | 0.11052/6.90 |
| 6 | Channel-free material | 6.5 | 5.50 | 0.82700 | 1.09 | 0.03687/2.30 |
| 7 | | 6.0 | 5.40 | 0.72700 | 0.81 | 0.03439/2.15 |
| 8 | | 5.50 | 4.00 | 0.87700 | 0.64 | 0.03317/2.07 |
| 9 | | 5.00 | 4.00 | 0.81900 | 0.61 | 0.03724/2.32 |
| 10 | | 5.60 | 3.20 | 0.79400 | 0.50 | 0.03514/2.19 |
| 11 | | 5.80 | 3.10 | 0.80540 | 0.55 | 0.03798/2.37 |

The channel(s) 12, the channel system 14, and the pattern(s) may fulfill one or more functions of the mat. For example, the channels 12 may be designed to lead water away from the mat surface into the channels 12. The water 12 may travel from the mat surface into the channels 12 and accumulate in the channels 12. The water may flow in the channels 12 and be distributed to the seed and/or soil the mat is designed to cover or shield. The pattern(s) thus allow better water distribution over the mat and to the area the mat covers, once it is applied over seed, soil, or a combination thereof.

A specific pattern may influence the speed and efficiency of water retention, distribution, and/or flow. For example, a pattern may be structured to efficiently lead water from the upper surface into the channels 12 and from the channels 12 laterally to the edge portions 18 of the mat 10. A pattern may thus encourage desirable lateral water movement within and off the mat 10. For example, due to the continuously-running channels, water may continue flowing, as opposed to a broken pattern causing obstacles to water flow. On the other hand, a broken or interrupted pattern may be desirable when water retention is desirable in a specific portion of the mat 10.

Different applications may benefit from a variety of patterns. For example, a pattern to be utilized in an erosion control project on a steep slope may be different than a pattern to be used in a relatively flat region. A pattern for erosion control may be different than a pattern for seed germination in a grow bag, plant growth, etc.

In a non-limiting example, water drainage may be encouraged by forming shallower channels 12 in the central portion 16 which may gradually transition into deeper channels in the edge portions 18 of the mat 10. The water landing on top of the mat surface thus tends to drain faster. The term "shallower" refers to channels or their portions with a lesser depth than the remaining deeper channels or their portions. The shallower channels or portions may be about, at least about, or at most about 1 to 10, 3 to 7, or 4 to 5% deeper than the deeper channels or their portions.

The channels 12 may also aid in preventing water runoff by capturing the water which could otherwise slide over and from the mat surface and accumulate outside of the mat or next to the edges of the mat. Such concentrated drainage could result in unwanted accumulation of water on either side of the mat, increase water runoff, exacerbate erosion, or a combination thereof.

Additionally, the channels 12 may provide structural reinforcement to the mat 10. Since the mat 10 may be relatively thin as was discussed above, the channels 12, in which the mat material is denser/more compacted/sturdier than in other parts of the mat 10, form a supporting structure for the mat 10. Additionally or alternatively, melted fibers lining the channels 12 or being present within the channels 12 may enhance tensile strength of the mat by forming a network of interconnected fibers. The mat 10 is thus relatively resistant towards common animal traffic, equipment damage, rips, and tears, which could otherwise more easily affect a mat free of denser areas such as those adjacent to the channels 12 and in the channels 12 of the mat 10. At the same time, it is desirable that the mat 10 retains some of its flexibility from before the channels 12 are formed as the flex allows foldability and/or a close contact with ground contours.

The channels may account for about, at least about, or at most about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 45, 50, 55, 60, 65, or 70% of the entire surface area of one or each side of the mat 10.

The mat 10 may be derived from a variety of organic sources. The mat 10 may be made from one or more types of fiber. The fiber may include a first portion and at least a second portion. Additional portions are envisioned. The first portion may include natural fiber and/or natural materials. The natural fiber may include fibers of coniferous and deciduous woods, cotton, wool, flax, jute, coconut, hemp, straw, grass, and other fibers available directly from natural sources, as well as chemically modified natural fibers, for example chemically modified cellulose fibers, cotton fibers, etc. Suitable natural fibers also include abaca, cantala, caroa, henequen, istle, Mauritius, phormium, bowstring, sisal, kenaf, ramie, roselle, sunn, cadillo, kapok, broom root, coir, crin vegetal, and piassaua. These lists of natural fibers are illustrative and not limiting. Examples of chemically modified fibers may also include azlon (regenerated natural proteins), regenerated cellulose products including cellulose xanthate (rayon), cellulose acetate, cellulose triacetate, cellulose nitrate, alginate fibers, casein-based fibers, and the like. The natural fibers may also include waste from textile processes where cloth, yarn, or thread of cotton, linen, wool, silk, etc., are used. The natural fiber may include paper fibers, paper flakes, processed cellulose fibers. The natural fibers may be crimped or non-crimped. The fibers may be fibers of a growing medium described in U.S. Pat. No. 10,266,457, which is hereby incorporated by reference in its entirety. The first portion may be free of any synthetic or man-made materials and/or fibers.

The second portion may include man-made, artificial, or synthetic fiber. The second portion may include a single component fiber or bicomponent fiber. The bicomponent fiber may include fibers having a high-melt temperature core and a low-melt temperature sheath. The core may include a polyester. The sheath may include a polyolefin such as polyethylene, polypropylene, including copolymeric polyethylene polymers and polypropylene polymers, polyethylene homo- or co-polymers, or their combination. The important consideration is that the bicomponent fiber be an integral fiber containing both polymers, regardless of physical arrangement, so long as the low temperature polymer is not completely surrounded or obscured by the high temperature polymer. By the term "high-melt temperature" is meant a melting temperature such that the core of the fiber does not melt and thus lose its integrity under mat consolidation conditions. Some softening of the core is allowable. By "low-melt temperature" is meant a temperature at which the sheath polymer softens and/or melts to the degree necessary to bind the natural fibers and other constituents of the mat together.

The second portion may include conventional synthetic fibers other than bicomponent fibers. Such fibers may include fibers of relatively low-melt temperature, i.e., which will soften appreciably and/or melt under mat consolidation temperatures, and those of relatively high-melt temperature, i.e., which will remain integral under mat consolidation conditions. The terms "relatively" low and "relatively" high are used to describe the melting temperatures of the non-bicomponent fibers, since melting of these fibers is dependent upon the mat consolidation temperature which is in turn dependent upon the melting point of the low-melt temperature portion of the bicomponent fibers. A "relatively low-melt" temperature fiber will show at least some appreciable softening and/or melting during consolidation, while "relatively high-melt" temperature fibers will exhibit substantially no melting whatsoever. Thus, the relatively low-melt temperature fibers may assist in mat bonding, with greater assistance in this respect as the consolidation temperature increases, while relatively high-temperature fibers generally produce no increase in binding, but an increase in tensile strength of the mat due to these fibers retaining their integrity during consolidation.

Non-limiting examples of the relatively low-melt temperature fibers may be polyolefin homopolymers and copolymers, for example polyethylene fibers and polypropylene fibers. The relatively high-melt temperature fibers may include high density polyethylene fibers, polyester fibers, polycarbonate fibers, polyamide fibers, rayon fibers, polyvinylalcohol fibers, polyvinylacetate fibers, polyacrylonitrile fibers, carbon fibers, and the like. The fibers may be virgin fibers, fibers obtained as recyclable products from textile and/or carpet manufacture, or any other source. The synthetic fibers other than bicomponent fibers may have a denier of about 2 to 64, 4 to 32, or 8 to 16.

The mat may include a third portion including natural and/or synthetic binders, water absorbents, dyes and/or pigments, fertilizers, macronutrients, micronutrients, seeds, etc. Examples of such components are discussed in U.S. Pat. Nos. 10,266,457 and 8,567,117, disclosures of which are hereby incorporated by reference herein.

The binders may include non-filamentary binders such as powders or dispersions of natural or synthetic gums, resists, starches such as corn starch, naturally occurring gums such as guar gum, gum tragacanth, and the like, and modified celluloses such as hydroxyalkyl celluloses and carboxyalkyl celluloses. Synthetic binders may include a variety of polymers, particularly addition polymers produced by emulsion polymerization and used in the form of aqueous dispersions or as spray dried powders. Examples include styrene-butadiene polymers, styrene-acrylate polymers, polyvinylacetate polymers, polyvinylacetate-ethylene (EVA) polymers, polyvinylalcohol polymers, polyacrylate polymers, polyacrylic acid polymers, polyacrylamide polymers and their anionic- and cationic-modified copolymers, i.e., polyacrylamide-acrylic acid copolymers, and the like. Powdered polyethylene and polypropylene may also be used. When used, synthetic binders may be used in aqueous form, for example as solutions, emulsions, or dispersions.

Thermoset binders may also be used, including a wide variety of resole and novolac-type resins which are phenol/formaldehyde condensates, melamine/formaldehyde condensates, urea/formaldehyde condensates, and the like. Most of these are supplied in the form of aqueous solutions, emulsions, or dispersions, and are generally commercially available. Melamine/formaldehyde, urea/formaldehyde, urea/melamine/formaldehyde and like condensates may also serve as a slow release nitrogenous fertilizer.

Water absorbents may also be included such as generally linear or crosslinked addition polymers of the polyacrylate or polyacrylamide type. One such absorbent is Tackifier III, a polyacrylamide-based absorbent available from Profile Products, Inc., Chicago, Illinois. Flocculants may also be included.

Granulated fertilizer, powdered fertilizer, fertilizer prills, etc., may also be included. Grass or crop seed, including seeds of annuals or perennials may also be included, in amounts which correspond, preferably, to the desired areal seed distribution, or less than this desired distribution when seeds are to be sown as well. Pigments and dyestuffs may also be included, as well as any conventional additives employed in fiber mats to date. For example, the mat 10 shown in FIG. 3B includes a dye.

The mat 10 may be produced by the following process. The first, second, and/or optionally third portions may be premixed or supplied in the form of their individual components, by methods well-known to those skilled in the art, for example by distribution in air followed by collection on a belt or foraminous screen. The premix may contain the first and second portions, the first, second, and third portions, the first and third portions, second and third portions, only the first portion, or only the second portion. Methods of fabrication are further disclosed in U.S. Pat. Nos. 5,330,828, 5,302,445, 10,266,457, and 8,567,117 which are herein incorporated by reference. The constituents may be deposited by water-laying methods as well, as in paper making machines, particularly when water soluble ingredients are avoided. Water-laying may be especially suitable when water soluble or dispersible binders are employed. These binders may also be sprayed onto an as-layered mat or sprayed into the air stream conveying fiber components when air-laying is used. Once laid into a mat, the fibers may be carded, crosslapped, stitched, needled, or otherwise treated by conventional techniques used with non-woven materials.

Once the mat components are combined and assembled into an as-laid mat, the mat may be consolidated using heat, pressure, or both. For example, the mat may be exposed to a threshold temperature. The threshold temperature is at least a temperature at which a component of the synthetic fiber melts and binds the fibers together. The threshold temperature is at least a temperature at which the low-melt temperature component of the synthetic fiber melts and binds the fibers together. The threshold temperature may be a temperature sufficient to soften and/or fuse the low-melt polymer of the synthetic fiber. The threshold temperature is a lower temperature than a temperature required to melt a high-melt component of the synthetic fiber. The threshold temperature may be a temperature lower than a temperature required to melt and/or structurally damage the first portion, the third portion, or both.

The threshold temperature may be selected such that the bicomponent fiber sheaths melt to consolidate the mat, and low-melt temperature synthetic fibers, if included, as least partially melt as well. But the threshold temperature should be a temperature at which the core polymers of the bicomponent fibers and high-melt temperature conventional fibers do not melt or do not melt to the degree that their strength imparting properties are lost. The threshold temperature may be achieved by preheating the mat such as in an oven, with infrared energy, by heated consolidation rollers, or any combination thereof, so long as the low-melt temperature polymers, whether contained in conventional or bicomponent fibers, melt to the degree necessary to bind the mat constituents.

Heating may be conducted by infrared heating, for example using commercially available radiant panels, microwave technology, an oven, or by utilizing another source of thermal energy. Heated rollers may be also used to apply heat and pressure at the same time. The gap between the rollers may be adjustable to impart a desired amount of pressure depending on the dimensions of the as-laid mat and on the desired thickness of the end product. The pressure may be applied at the threshold temperature or a lower temperature than the threshold temperature.

The method also includes formation of the one or more channels discussed herein. The channels may be formed during various steps of the process. For example, the channels may be formed during consolidation of various materials present in the mat, as the as-laid mat is assembled, after the as-laid mat is assembled, after at least a portion of the synthetic fibers is melted, or the like.

The channels may be formed by applying pressure via one or more rollers containing a pattern. The rollers may include the pattern as a raised image. As the raised image is pressed into the mat, the rollers imprint a pattern of recessed channels into the mat. The rollers may be heated to a temperature lower, higher, or equal to the threshold temperature as long as the temperature does reach a melting temperature of the core of the bicomponent fiber or a melting temperature of the high-melt polymers. The channels are formed as regions pressed into the mat surface.

The channels may be formed continuously such that the mat passes between two rollers, at least one of which includes the raised image. Both rollers may include a raised image. Both rollers may include the same or different raised image. The process speed may be adjusted to afford sufficient time for the channel pattern to be formed.

Alternatively, the mat may be stamped with a press or stamp having the raised image. The press or stamp may be brought in contact with the surface of the mat to receive the channels, held in place until the channel pattern reaches a desired depth and definition, and lifted off of the mat surface. This process may be continuous or discontinuous.

In a yet another embodiment, a device such as a heated rod or a heated tool may be selectively applied to portions of the mat to form a channel pattern. The heated rod may be heated to a threshold temperature to at least partially melt fibers upon contact. The heated rod may also apply pressure to more precisely define a shape of the channels within the pattern. A tool like a heated rod may allow for customization of the channels and patterns.

In one or more embodiments, formation of the channels may also serve as a secondary fiber bonding step. In the first step of such embodiment, fibers may be melted only partially, possibly utilizing lower temperature or a shorter exposure time period to heat and/or pressure. The as-laid mat with partially melted fibers may be subsequently exposed to the rollers and/or stamps with a raised image to impart the channel pattern onto the mat while applying additional heat to melt additional fibers or additionally melt partially-melted fibers to further consolidate the mat.

The amount of pressure, temperature, and length of time pressure/heat is applied onto various portions of the mat surface to form the channels may vary, depending on the desired final pattern of the channel system, desired dimensions of the mat such as mat thickness, desired density of different regions of the mat, desired final dimensions of the channels such as channel depth and width, the like, or a combination thereof. Once the desired channel pattern is achieved, pressure/heat is released, and the mat may be prepared for storage, packaging, transportation, application, or a combination thereof. The preparing step may include cooling down, cutting, folding, rolling, inserting the mat in a bag, wrapping in a protective material, or the like. Throughout the entire process, conveyor belts may be used to transport components and the mat from one station or step to another. The process may include manual steps or be at least partially or fully automated.

Figure 5:
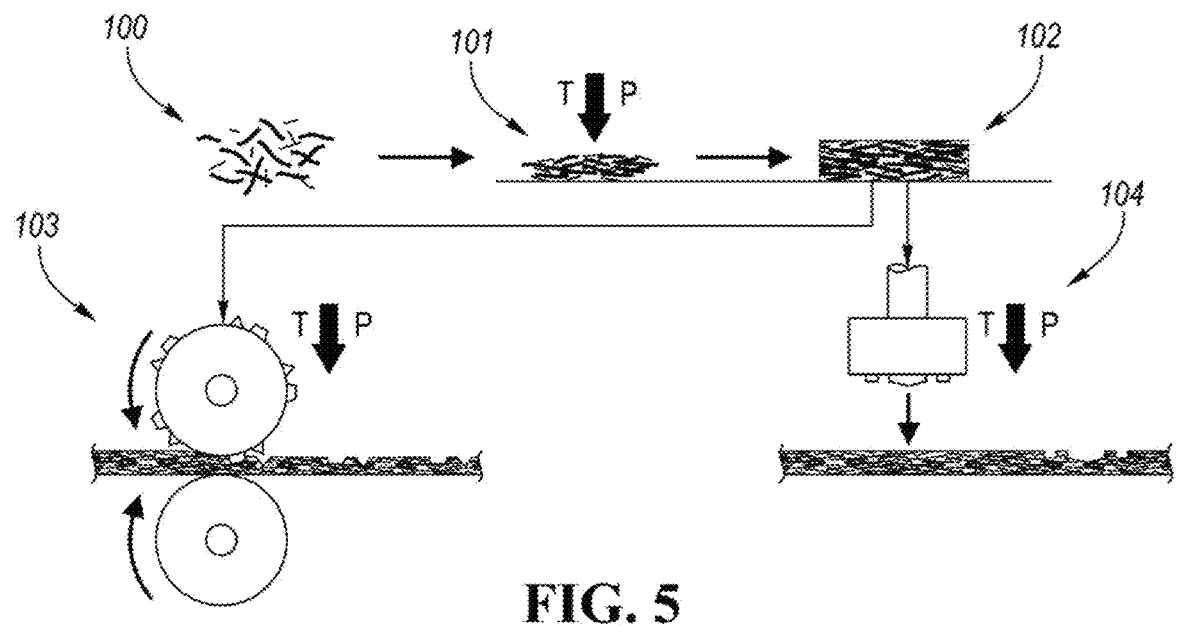
FIG. 5 is a schematic depiction of a non-limiting example of a process used to produce the mat disclosed herein.

A non-limiting example of the process steps is schematically depicted in FIG. 5. In step 100, the individual components are mixed. In step 101, elevated temperature and/or pressure is applied to form an as-laid mat. In step 102, the as-laid mat is exposed to the elevated temperature and/or pressure for a sufficient amount of time to melt some of the fibers, as discussed above, to form the consolidated mat. In steps 103 or 104, the channels are imprinted into the surface of the mat. Specifically, in step 103, the channels are formed by pressing one or two rollers having a raised image onto the mat which passes between the rollers. The step 103 may include elevated temperature and/or pressure. Alternatively, the channels may be formed as the mat passes under a stamp or press having the raised image, as is shown in step 104.

In some embodiments, formation of the channels and melting of the fibers may be achieved by mixing the synthetic fibers of the second portion with the first and/or third portion. The mixing may achieve a relatively uniform distribution of the second portion within the entire mixture to form the as-laid mat. The as-laid mat may include a web of unconsolidated fiber and/or other components.

Alternatively, the synthetic fibers of the second portion may be more precisely positioned in the areas of the as-laid mat where channels will be formed. The second portion may be laid onto the first portion or a mixture of the first portion and the third portion. In such embodiment, the second portion may be concentrated in the areas where channels will be formed. The second portion may be selectively applied in a pattern which may closely follow the desired channel pattern such that the localized synthetic fiber corresponds to the desired channel pattern. The second portion may be distributed evenly or unevenly on the surface of the as-laid mat. The second portion may be applied, sprinkled, dropped, layered, piled, spread, or the like such that the second portion covers the areas where channels will be formed.

In a yet another embodiment, the second portion may be included as a net of fibers to be placed over the surface of the as-laid mat. The net may be biodegradable. The net may be in addition or in the alternative to the second portion being mixed within the as-laid mat. The net may be shaped as a channel pattern.

Alternatively still, the second portion may be absent such that only a first portion and/or third portion is present. The resulting material may thus be free of synthetic fibers, synthetic materials, and/or man-made materials. The resulting material may be thus all-natural such as including natural fibers and/or natural materials. The material may be biodegradable, compostable, recyclable, reusable, easy to dispose of, and/or lowering carbon footprint.

The process may include the steps of mixing fibers and providing an as-laid mat as was described above, but no fibers would be melted. In such embodiment, the channels may be formed either by pressure only or by an alternative technique of forming recessed channels. A non-limiting example of such technique may include stitching, sewing, fastening, or stapling. Another alternative method may include an application of molten material, for example, as an applied bead, after pressure is applied to stabilize the shape of the channels.

In spite of the fiber consolidation and melting, the mat may have an open construction designed to encourage seed germination and allow seedlings to penetrate and grow through the mat while the roots are protected beneath and/or within the mat.

The mat with channels described herein may be used for a variety of purposes. For example, the mat may be used in an erosion control system or as an erosion-control mat. The mat may be applied over bare soil, seed, and/or vegetation to stop, slow down, and/or prevent erosion. The mat may be relatively thin such that the mat may maintain a relatively close contact with the ground contours to further reduce run-off and erosion as well as minimize damage caused by wildlife traffic, equipment, etc. The mat may be designed to remain in substantially the same condition as applied for a certain amount of time and disintegrate into non-toxic species afterwards.

The mat may be used for seed germination, plant starters, plant growth, hydroponic uses, etc. The mat may be used in a grow bag such as a plastic bag designed to germinate seeds, encourage seedlings, support small plant growth. The mat may be relatively thin. The relatively thin mat may be folded to form a layered product to be placed in a grow bag. The mat may be folded in a variety of ways such as in an accordion fold including 1, 2 3, 4, 5, 6, 7, 8, 9, 10, 11, 12, 13, 14, 15, 16, 17, 18, 19, 20, or more folds.

The channels may be aligned or misaligned in the folds. For example, at least some of the channels may be aligned such that a channel from an upper surface of one fold, or a first piece of the mat, may be aligned with a channel from a lower surface of a second fold, or a second piece of the mat. The channels thus increase the volume of water which may drain out of the slab faster. Alternatively, the channels may be arranged to be purposefully misaligned such that crossing of individual channels of different folds, or pieces of the mat, is minimized or discouraged. In such arrangement, the water is kept in the slab longer.

The mat may be formed into a relatively thick slab, the thickness being determined by dimensions of a grow bag the mat would be placed into. The mat may be trimmed and cut according to the dimensions of the grow bag. For the seed germination embodiment, it may be desirable to include just natural fibers and materials. To form the channel pattern, a hot rod, a press, or a stamp may be applied.

Figure 6:
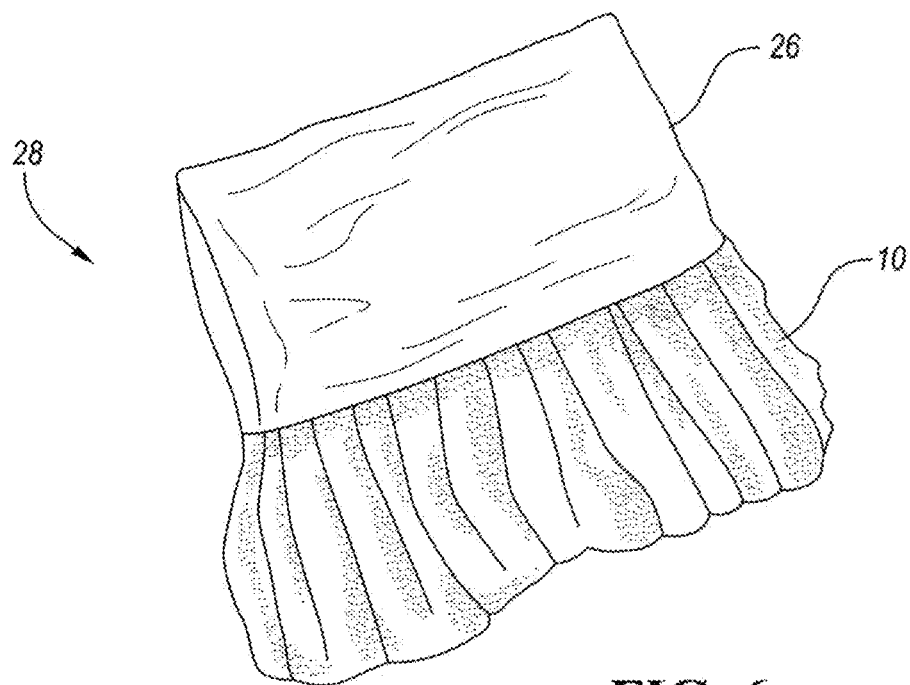
FIG. 6 is a photograph of a non-limiting example of a grow bag including the mat in an accordion-fold.

A non-limiting example of the layered system for the grow bag is depicted in FIG. 6. As can be seen, the mat 10 is folded in an accordion fold to fit within a plastic casing 26 of a grow bag 28. The slab includes a continuous sheet of the mat including a plurality of layers folded in an accordion configuration. Other folded configurations are contemplated. For example, the sheet of the mat may include the following types of fold: z-fold, roll fold, gate fold, double parallel fold, French fold, map fold, etc.

In an alternative embodiment, the relatively thin mat may be cut into individual pieces and layered to form a slab. The individual pieces or portions may have the same or different dimensions. Each one of the individual pieces may form a separate layer. Each one of the individual pieces and/or layers has may have edges defining the separate layer. The individual pieces may be bonded or otherwise physically and/or chemically connected together. The individual layers may be bound together by a hot iron, rod, press, stamp, etc. Alternatively, the individual pieces may be loose with no physical and/or chemical connection between individual layers.

Figure 7A:
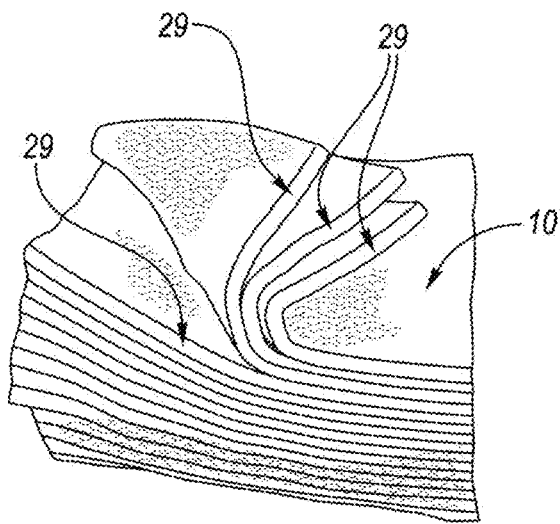
FIGS. 7A-7D are photographs showing a non-limiting example of cut individual pieces of the mat, a slab formed from the individual pieces, and a grow bag including the slab.
Figure 7B:
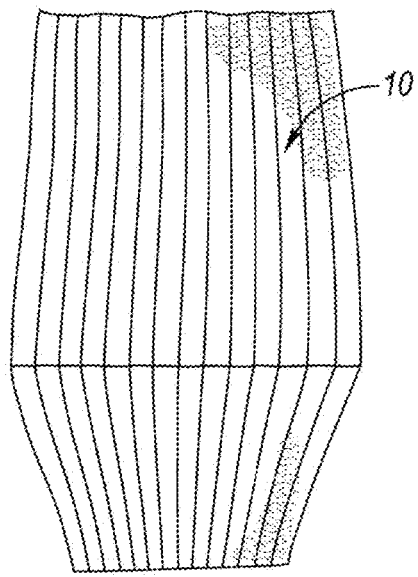
Figure 7C:
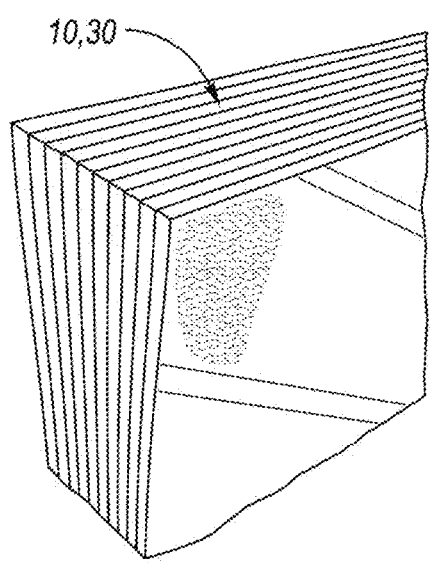
Figure 7D:
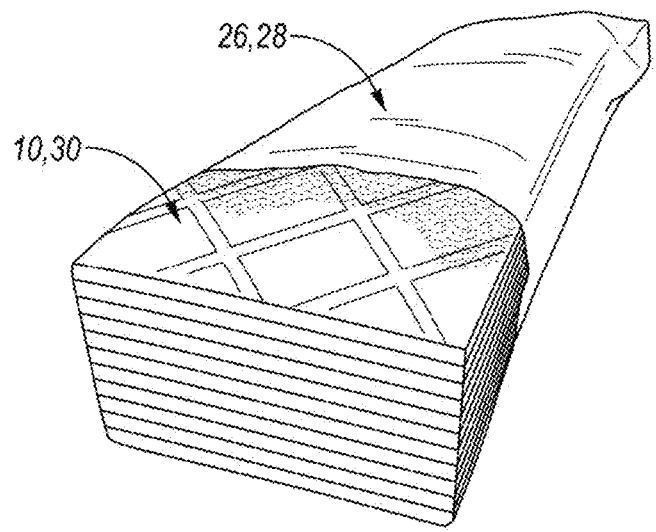

FIG. 7A shows a non-limiting example of separate layers of the mat 10. The individual layers, formed from individual pre-cut pieces 29, were placed on top of each other to form a slab 30. FIG. 7B shows the slab 30 after a hot iron was pressed against the cut edges of the individual pieces to bind the layers together. The formed slab 30 is shown in FIG. 7C. FIG. 7D depicts the layered slab 30 placed in a plastic casing 26 of a grow bag 28.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A fiber mat comprising:
natural wood fibers and synthetic fibers formed into an elongated strip having an upper surface and a lower surface, the upper surface having a first plurality of channels extending into the elongated strip, each of the first plurality of channels having a channel depth being different in a central portion of the mat than in an edge portion of the mat, and wherein each one of the first plurality of channels has a first wall and a second wall, the first wall extending at an angle from the upper surface toward the second wall and the second wall extending at an angle from the upper surface toward the first wall.

2. The fiber mat of claim 1, wherein the lower surface further includes a second plurality of channels.

3. The fiber mat of claim 1, wherein the channel depth is greater in the central portion than in the edge portion.

4. The fiber may of claim 1, wherein the channels are not parallel to edges of the mat.

5. The fiber mat of claim 1, wherein the channel depth is less than 50% of a mat thickness.

6. The fiber mat of claim 1, wherein the first plurality of channels forms a diamond pattern.

7. An erosion mat comprising:
natural fibers, including wood fibers, and synthetic fibers formed into an elongated strip having an upper surface and a bottom surface, the upper surface having a plurality of channels extending into the elongated strip, each of the plurality of channels having a channel width being different in a central portion of the mat than in an edge portion of the mat,
wherein each one of the plurality of channels has a first wall and a second wall, the first wall extending at an angle from the upper surface toward the second wall and the second wall extending at an angle from the upper surface toward the first wall.

8. The erosion mat of claim 7, wherein each channel of the plurality of channels has a first thickness and a remainder of the elongated strip has a second thickness greater than the first thickness.

9. The erosion mat of claim 7, wherein the channels are not parallel to edges of the mat.

10. The erosion mat of claim 7, wherein each channel of the plurality of channels has a channel depth being less than 50% of a mat thickness.

11. The erosion mat of claim 7, wherein each channel of the plurality of channels has a first density and a remainder of the elongated strip has a second density, the first density being greater than the second density.

12. The erosion mat of claim 7, wherein the synthetic fibers are present only in the plurality of channels.

* * * * *